United States Patent
Pal

(10) Patent No.: US 8,272,066 B2
(45) Date of Patent: Sep. 18, 2012

(54) SYSTEMS, METHODS AND APPARATUS FOR REDUCING UNAUTHORIZED USE IN A TELEVISION DISTRIBUTION SYSTEM

(75) Inventor: Rajiv Singh Cullen Pal, Denver, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 867 days.

(21) Appl. No.: 12/130,783

(22) Filed: May 30, 2008

(65) Prior Publication Data

US 2009/0300773 A1 Dec. 3, 2009

(51) Int. Cl.
H04L 29/06 (2006.01)
(52) U.S. Cl. ............... 726/29; 726/27; 726/33
(58) Field of Classification Search ............ 726/27, 726/29, 33
See application file for complete search history.

(56) References Cited

U.S. PATENT DOCUMENTS

| | | | |
|---|---|---|---|
| 4,245,245 A * | 1/1981 | Matsumoto et al. | 380/211 |
| 5,519,760 A | 5/1996 | Borkowski et al. | |
| 5,594,425 A | 1/1997 | Ladner et al. | |
| 6,477,363 B1 | 11/2002 | Ayoub et al. | |
| 7,716,325 B2 * | 5/2010 | Brown | 709/224 |
| 2002/0023010 A1 | 2/2002 | Rittmaster et al. | |
| 2003/0026424 A1 | 2/2003 | McGarrahan et al. | |
| 2004/0093370 A1 * | 5/2004 | Blair et al. | 709/200 |
| 2004/0161031 A1 | 8/2004 | Kwentus et al. | |
| 2004/0203374 A1 | 10/2004 | Zilliacus | |
| 2004/0226043 A1 * | 11/2004 | Mettu et al. | 725/46 |
| 2004/0250273 A1 | 12/2004 | Swix et al. | |
| 2006/0053436 A1 | 3/2006 | Allwein et al. | |
| 2006/0101526 A1 * | 5/2006 | Sachot | 726/29 |
| 2006/0173782 A1 | 8/2006 | Gargi | |
| 2007/0113081 A1 * | 5/2007 | Camp | 713/168 |
| 2007/0167171 A1 | 7/2007 | Bishop | |
| 2007/0299681 A1 * | 12/2007 | Plastina et al. | 705/1 |
| 2009/0259738 A1 * | 10/2009 | Zimmermann et al. | 709/221 |

FOREIGN PATENT DOCUMENTS

| | | |
|---|---|---|
| EP | 1734675 A | 12/2006 |
| GB | 2344009 A | 5/2000 |
| WO | WO 02/076100 A | 9/2002 |
| WO | 2006114123 A1 | 11/2006 |
| WO | WO 2006/114123 A | 11/2006 |
| WO | WO 2006114123 A1 * | 11/2006 |

OTHER PUBLICATIONS

Mundt, T. "Authenticated location in wireless mesh networks", Mar. 2006, GCC Conference (GCC), 2006 IEEE.*
International Search Report for PCT application PCT/US2009/044301, mailed on Aug. 5, 2009.

* cited by examiner

Primary Examiner — Kambiz Zand
Assistant Examiner — Michael Guirguis
(74) Attorney, Agent, or Firm — Ingrassia Fisher & Lorenz, P.C.

(57) ABSTRACT

Systems, method and apparatus are described for reducing unauthorized usage in a television distribution system. A television receiver communicates with base stations of a wireless communication network. Based on the communications with the base station, the television receiver identifies its location and transmits the location information to a data collection system through the wireless communication network. The data collection system utilizes the location information to identify unauthorized uses of the television receiver.

20 Claims, 6 Drawing Sheets

SYSTEMS, METHODS AND APPARATUS FOR REDUCING UNAUTHORIZED USE IN A TELEVISION DISTRIBUTION SYSTEM

BACKGROUND

Unauthorized and fraudulent use of television receivers is a major problem for television providers. Unauthorized use of television receivers can take multiple forms, including piracy of signals, account packing and the use of a television receiver at unauthorized locations to receive different programming. In a satellite television distribution system, unauthorized use of a television receiver is easier to perpetuate than in wired television distribution systems (e.g., cable or fiber), because a television receiver can be placed into use in almost any geographic region within reception range of the satellite without the knowledge of the satellite television provider. Because the television receiver may not be connected bi-directionally to the satellite, it is difficult to detect the existence or location of a pirated or unauthorized television receiver.

To combat piracy, fraud and other types of unauthorized use, satellite television receivers often include a modem that communicates with a call processing system of a satellite television provider periodically to exchange data. Account packing is one type of unauthorized use that may be identified by a call processing system. Account packing involves a subscriber leasing multiple legitimate television receivers for use in a single location and instead using the receivers in disparate locations. For example, a satellite television subscriber may utilize one television receiver at their home, and may allow a friend to use another television receiver at the friend's home. In effect, the subscriber and the friend get two accounts while only paying for a single account. By collecting data from the television receivers through telephone calls, the satellite television provider may identify television receivers which are utilized in unauthorized locations. However, a user may simply disconnect the television receiver from the phone line, restricting the ability of the television receiver to communicate with the call processing system. Thus, the satellite television provider is unable to collect data that allows for the detection of account packing, piracy and other types of unauthorized use.

BRIEF DESCRIPTION OF THE DRAWINGS

The same number represents the same element or same type of element in all drawings.

DETAILED DESCRIPTION

Figure 1:
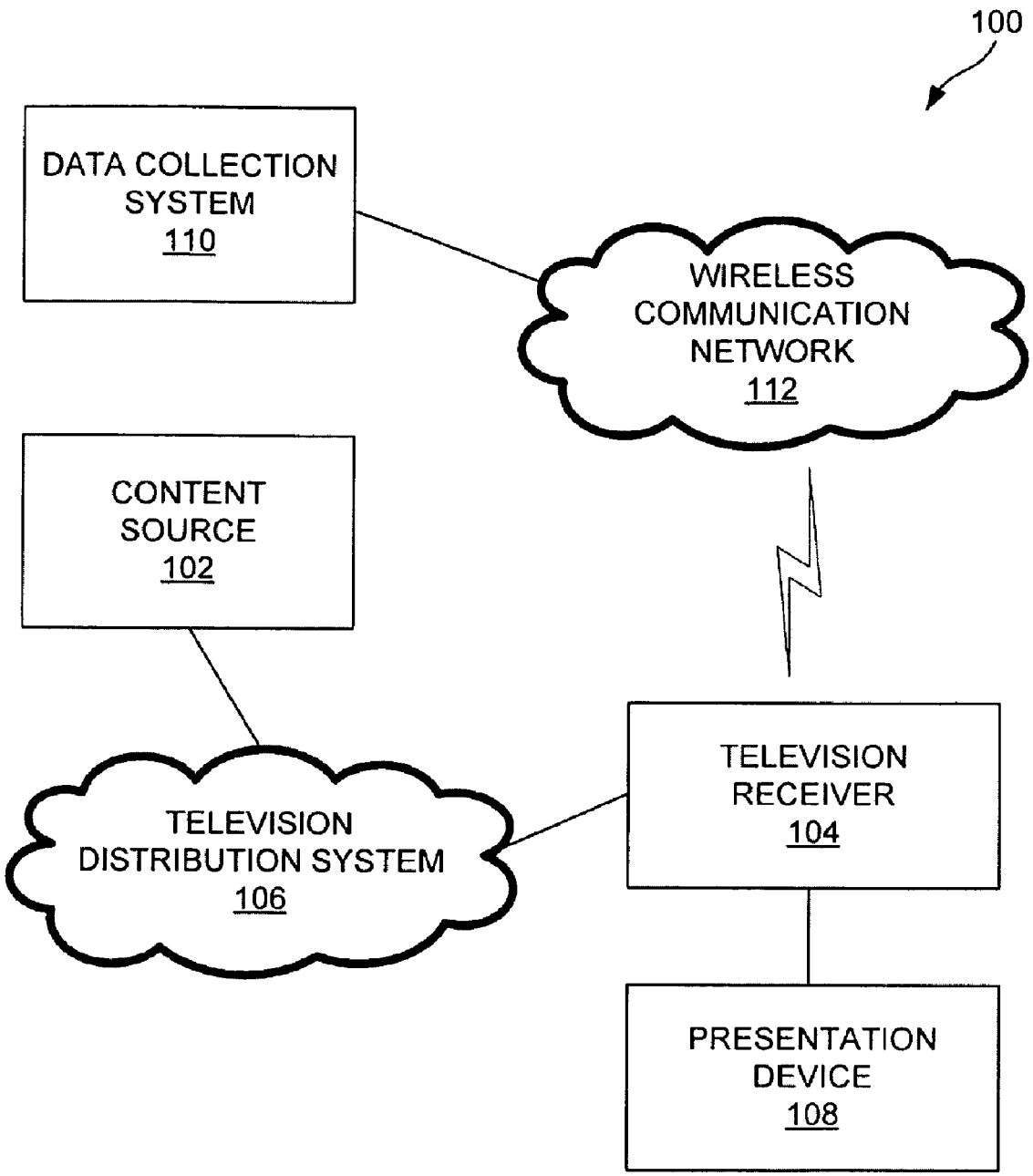
FIG. 1 illustrates an embodiment of a communication system.

The various embodiments described herein generally provide apparatus, systems and methods which facilitate the collection of data from television receivers. More particularly, the various embodiments described herein facilitate the detection of unauthorized usage of a television receiver in a television distribution system. A television receiver communicates data to a data collection system through a wireless communication network. Through the collection of data, the data collection system detects piracy, account packing and other types of unauthorized usage perpetuated by users of a television receiver. In short, the various embodiments described herein provide systems, methods and apparatus for reducing unauthorized usage in a television distribution system through the exchange of data between a television receiver and a data collection system over a wireless communication network.

In at least one embodiment, a television receiver communicates with one or more base stations of a wireless communication network. The wireless communication network may provide any type of communication service, such as telephone or internet services. Based on communications exchanged between the base stations and the wireless communication network, a location of a television receiver may be identified. For example, communications exchanged between three or more base stations and the television receiver may be utilized to triangulate the location of the television receiver. Information regarding the location of the television receiver may be transmitted to the data collection system through the wireless communication network. In at least one embodiment, the location information is transmitted to the data collection system in association with other data, such as usage information, health and diagnostics information, signal quality information and the like. The data collection system utilizes the location information and/or the other data to identify piracy, account packing and other types of unauthorized usage of a television receiver.

For example, the data collection system may receive location information from two different television receivers associated with the same subscriber account. The location information received from the two television receivers may indicate that each receiver is located in a different zip code or otherwise disparately located. Thus, the data collection system may identify an account packing situation with the two television receivers. The data collection system may then output the information to an operator monitoring the operation of a television distribution system. The operator may then choose an appropriate course of action to remedy the unauthorized reception of programming by the television receivers. In at least one embodiment, the data collection system may take corrective action without operator intervention, including transmitting a command that disables the reception of content by one or more of the television receivers, remedying the account packing situation. Responsive to receiving a disablement command, the television receiver is disabled from outputting audio/audio/video content. The disablement command may disable the output of all audio/video content by the television receiver or some subset thereof.

In another scenario, the data collection system may receive location information and other data from a television receiver which is not associated with an active account of the television distribution system (e.g., a pirated television receiver). Other data associated with the location information may further indicate that the television receiver is being utilized to receive unauthorized programming. Thus, the data collection system may identify that the television receiver is not authorized to receive programming based on the location information and other data received from the television receiver. In at least one embodiment, the data collection system takes corrective action, such as transmitting a command that disables the television receiver, eliminating the unauthorized reception of programming by the television receiver.

In another scenario, a user may transfer a television receiver from an authorized location to a different location to receive out-of-market programming that is not authorized for reception at the different location. For example, a user from Phoenix may purchase a subscription for the television receiver at an address in Chicago, and may transfer the receiver to Phoenix in order view Chicago programming in Phoenix. In at least one embodiment, the data collection system receives location information from a television receiver indicating that the television receiver is located in Phoenix. The data collection system further identifies that the television receiver is authorized for use in Chicago. Thus, the data collection system identifies that the television receiver is located at an unauthorized location. In at least one embodiment, the data collection system takes correction action to eliminate the unauthorized reception of programming by the television receiver in Phoenix.

For example, the data collection system may transmit a command to disable the reception of programming by the television receiver. Alternatively, the data collection system may transmit a command modifying the access parameters of the television receiver (e.g., information utilized by the television receiver to determine when particular content is authorized for output by the television receiver). For example, the television receiver access parameters may be modified so that the television receiver is restricted from receiving Chicago specific programming, and may be further modified to grant access by the television receiver to the Phoenix specific programming instead. Thus, the television provider is able to eliminate the reception of programming at the unauthorized location by modifying the television receiver to receive and output the programming authorized at the location of the television receiver.

FIG. 1 illustrates an embodiment of a communication system 100. The communication system 100 includes a content source 102, a television receiver 104, a television distribution system 106, a presentation device 108, a data collection system 110 and a wireless communication network 112. Each of these elements will be discussed in greater detail below. Further, the communication system 100 may include other elements, components and/or devices not illustrated for the sake of brevity.

The content source 102 is operable for receiving, generating and communicating content to one or more television receivers 104. The content to be received, processed, outputted and/or communicated may come in any of various forms including, but not limited to, audio, video, data, information, or otherwise. In at least one embodiment, the content source 102 is operable for receiving various forms and types of content from other sources, aggregating the content and transmitting the content to the television receivers 104 through the television distribution system 106. It is to be appreciated that the content source 102 may receive practically any form and/or type of information from one or more sources including streaming television programming, recorded audio or video, electronic programming guide data and the like.

The television distribution system 106 is operable to transmit content from the content source 102 to the television receiver 104. The television distribution system 106 may comprise any type of wired (e.g., cable and fiber) and/or wireless (e.g., cellular, satellite, microwave, and other types of radio frequency) communication mediums and any desired network topology (or topologies when multiple mediums are utilized). Exemplary television distribution systems 106 include terrestrial, cable, satellite and internet protocol television (IPTV) distribution systems. In at least one embodiment, the television distribution system 106 broadcasts or multicasts content to a plurality of television receivers 104. The television distribution system 106 may also distribute content to a specific addressable television receiver 104 (e.g., video-on-demand and the like). In at least one embodiment, the content source 102 may be embodied as a transmission facility of the television distribution system 106. Exemplary content sources 102 include over-the-air transmission facilities, cable television distribution head-ends, satellite television uplink centers, broadband or internet servers and the like.

The television receiver 104 is operable to receive content from the television distribution system 106, and to output the received content for presentation by the presentation device 108. In at least one embodiment, the presentation device 108 is a display device (e.g., a television) configured to display content to a user. The television receiver 104 may receive an audio/video stream in any format (e.g., analog or digital format), and output the audio/video stream for presentation by the presentation device 108. For example, the television receiver 104 may be a satellite, cable, over-the-air, broadband or other type of television receiver that receives and demodulates television signals that are outputted for display on a display device (e.g., a television). As used herein, a television receiver may also be referred to as a set-top box, which is a television receiver that is located externally with respect to a display device. The television receiver 104 maybe further configured to output menus and other information that allow a user to control the output of audio/video content by the television receiver 104. In some embodiments, the television receiver 104 and the presentation device 108 may be integrated as a device combining the functionality of a display device and a set-top box, digital video recorder (DVR) or the like.

The television receiver 104 is further operable to generate or aggregate data for transmission to a data collection system 110. The aggregated data may come in any of various forms including, but not limited to, audio, video, text, data, information, or otherwise. For example, the television receiver 104 may aggregate data regarding the output of audio/video content by the television receiver 104 as well as the general operating conditions of the television receiver 104. For example, the aggregated data may include various types of data generated by a television receiver, including pay-per-view ordering information, demographic information, health and diagnostic information, signal reception quality information, account information and the like. The health and diagnostics information may be augmented by performance statistics, including whether the television receiver 104 is overheating, the processor speed for the television receiver 104 and/or the space utilized on a hard drive of other storage medium of the television receiver 104. In at least one embodiment, the aggregated information includes power statistics, e.g., information regarding when a particular television receiver is powered on/powered off. The information may further include data regarding what time of day (if ever) that a particular television receiver is unplugged/disconnected from a power supply. Such information may indicate a user that is attempting to restrict the transmission of data from a television receiver 104 to the data collection system 110.

The television receiver 104 is operable to wirelessly communicate with the data collection system 110 through the wireless communication network 112. The wireless communication network 112 may include any type of communication network that provides any type of wireless connectivity between the television receiver 104 and the data collection system 110. Exemplary wireless communication networks 112 include wireless telephone networks (e.g., cellular) and wireless internet and data networks (e.g., WiFi, WiMax, ultra wide band (UWB) and the like). The television receiver 104 and the wireless communication network 112 may communicate using any type of wireless protocol, including Code Division Multiple Access (CDMA), Time Division Multiple Access (TDMA), Global System for Mobile Communications (GSM) and the like.

The wireless communication network 112 may include a variety of components not illustrated in FIG. 1 for the sake of brevity. Such components include a plurality of base stations, a mobile switching center (MSC), a home location register (HLR) and the like. In at least one embodiment, wireless communication network 112 is communicatively coupled to a public switched telephone network (PSTN). The data collection system 110 and the wireless communication network 112 may also be communicatively coupled through other types of data networks, such as local area network (LAN) or wide area network (WAN) that provides data communication services.

The television receiver 104 communicates with one or more base stations (not shown in FIG. 1) of the wireless communication network 112. The communications between the base stations and the television receiver 104 are utilized to identify the location of the television receiver 104. In at least one embodiment, the television receiver 104 identifies its location by measuring signal strengths and/or angles of reception for signals from the base stations to triangulate the location. For example, the location may be expressed as longitude and latitude coordinates.

Subsequent to identifying its location, the television receiver 104 transmits the location information to the data collection system 110 through the wireless communication network 112. In at least one embodiment, the location information is transmitted by the television receiver 104 to the data collection system 110 periodically. For example, the television receiver 104 may transmit the location information according to a pre-defined schedule. In other embodiments, the television receiver 104 transmits the location information to the data collection system 110 responsive to location changes. For example, the television receiver 104 may initially transmit its location information to the data collection system 110 upon installation and/or activation of the television receiver 104. Thereafter, the television receiver 104 may transmit location information to the data collection system 110 responsive to identifying a location change (e.g., the television receiver 104 is transferred to another home).

It is to be appreciated that the frequency for transmitting location information from the television receiver 104 to the data collection system 110 may be selected based on desired design criteria. For example, it may be beneficial for the data collection system 110 to continue receiving location information from the television receiver 104 regardless of whether the location information changes to ensure that the communication interface between the television receiver 104 and the wireless communication network 112 has not been disabled.

In some embodiments, the location information may be transmitted by the television receiver 104 to the data collection system 110 in association with other data. For example, the location information may be transmitted by the television receiver 104 to the data collection system 110 in association with usage information (e.g., pay-per-view ordering information or channel viewing information), health and diagnostics information, signal quality information, power statistics and the like. It is to be appreciated that the location information may be transmitted by the television receiver 104 to the data collection system 110 in association with any type of desired data generated, collected, aggregated and/or received by the television receiver 104.

The data collection system 110 may be any type of device, system or combination of devices or systems that receive data from a remotely located television receiver 104 over the wireless communication network 112. The data collection system 110 may be further operable to transmit data to the television receiver 104 over the wireless communication network 112. For example, the data collection system 110 may comprise a call processing system that receives data from the television receiver 104 though a PSTN and/or wireless telephone network. In another embodiment, the data collection system 110 comprises a server that receives data from the television receiver 104 over the internet or other type of data communication network. In at least one embodiment, the data collection system 110 is associated with a subscriber account information database, which may include account numbers, receiver identifying information, authorized locations of a receiver, authorized programming for receivers and the like.

In at least one embodiment, the data collection system 110 processes the location information and/or other data received from the television receiver 104 to detect piracy, account packing and/or other types of unauthorized uses of the television receiver 104. For example, the data collection system 110 may receive the location information from the television receiver 104 and compare the location information with an authorized location for the television receiver 104 stored in a subscriber account database. Thus, the data collection system 110 may determine whether the television receiver 104 is authorized to receive audio/video content at the identified location of the television receiver 104. Responsive to identifying that the television receiver 104 is not authorized to receive the audio/video content at the identified location, the data collection system 110 may identify account packing situations or reception of unauthorized programming (e.g., out-of-market programming). If the location information does not match the authorized location of the television receiver 104, then the data collection system 110 may flag the record of the television receiver 104 in the subscriber account database for further review by an operator.

In some embodiments, as described above, the data collection system 110 may transmit commands and other data to the television receiver to remedy the unauthorized usage of the television receiver 104. For example, the data collection system 110 may disable a television receiver 104 or modify the access parameters used for the reception of programming by the television receiver 104 responsive to identifying piracy, account packing, reception of unauthorized programming, usage in unauthorized locations and the like. A disablement command and/or modification command may be transmitted to the television receiver 104 through the wireless communication network 112 and/or the television distribution system 106. In at least one embodiment, the data collection system 110 is communicatively coupled to the content source 102 to facilitate the transmission of disablement commands and/or modification commands to the television receiver 104.

To identify unauthorized reception of programming by the television receiver 104, the data collection system 110 may process the location information in association with other data received from the television receiver 104. For example, the data collection system 110 may receive usage information indicating that the television receiver 104 has outputted premium channels and/or pay-per-view videos for presentation by the presentation device 108. The data collection system 110 may further query the subscriber account database to identify programming that the television receiver 104 is authorized to output. The subscriber account database may indicate that the television receiver 104 has not been authorized to output the premium channels and/or the pay-per-view videos. Thus, the data collection system 10 determines that the television receiver 104 is not authorized to receive particular audio/video content from the television distribution system 106. The data collection system 110 may flag the record of the television receiver 104 in the subscriber account database and/or may undertake other corrective actions without operator intervention, such as transmitting commands to the television receiver 104 as described above. The commands transmitted to the television receiver 104 may disable the television receiver 104 and/or may modify the access parameters of the television receiver 104.

In at least one embodiment, the data collection system 110 queries the subscriber account database and does not locate a record associated with the television receiver 104. Responsively, the data collection system 110 may identify that the television receiver 104 is a pirated receiver and may flag the received information regarding the television receiver 104 for review by an operator. In some embodiments, an operator may review the information to determine appropriate actions for remedies to the piracy situation. In other embodiments, the data collection system 110 may transmit information to the television receiver 104 to disable the unauthorized reception of programming by the television receiver 104.

The data collection system 110 may further process information/data received from the television receiver 104 to analyze the output of the audio/video content by the television receiver 104. For example, the data may include pay-per-view ordering information or other usage data, and the data collection system 110 may generate bills for users of the television receiver 104 based on the received data. In some embodiments, the data includes health and diagnostics information regarding the television receiver 104, and the data collection system 110 processes the data to identify operating problems of the television receiver 104.

Figure 2:
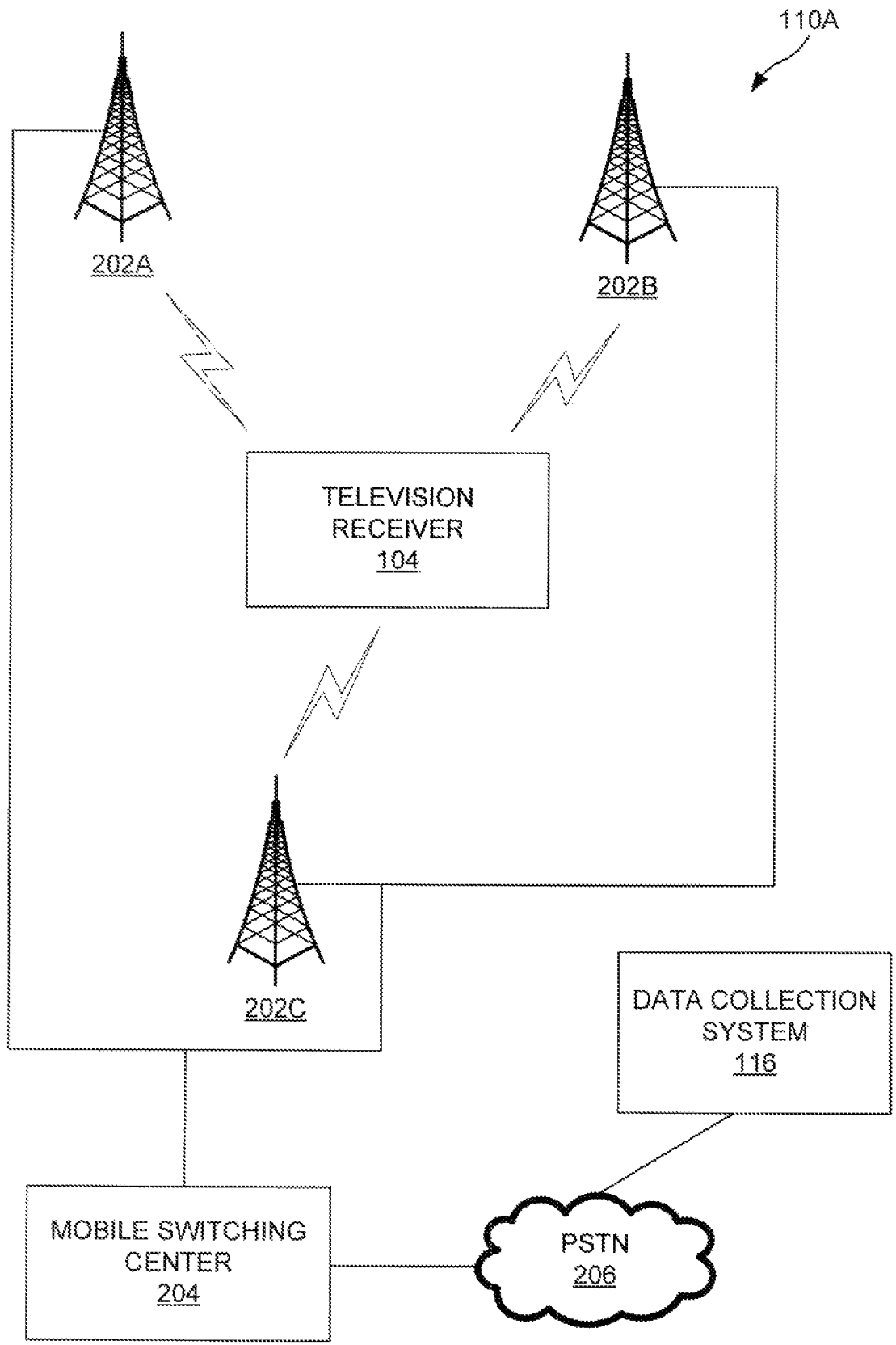
FIG. 2 illustrates an embodiment of a wireless telephone network.

As described above, the wireless communication network 112 of FIG. 1 may be embodied as a wireless telephone network. FIG. 2 illustrates an embodiment of a wireless telephone network 200. The wireless telephone network 200 includes a television receiver 104, a data collection system 110, a plurality of base stations 202A-202C, an MSC 204 and a PSTN 206. The wireless telephone network 200 may include other elements which are not illustrated for the sake of brevity of the discussion.

The base stations 202A-202C may comprise any type of base station utilized in a wireless telephone network 200. The television receiver 104 is operable to wirelessly communicate with the base stations 202A-202C. The television receiver 104 includes a wireless interface module operable to communicate with the base stations 202A-202C. In some embodiments, the television receiver 104 is assigned a telephone number or other identifier for addressing within the wireless telephone network 200. In at least one embodiment, the base stations 202A-202C provide a plurality of communication cells accessible to the television receiver 104. Each base station 202A-202C is in communication with the MSC 204. The MSC 204 provides switching functions between the base stations 202A-202C and the PSTN 206.

The television receiver 104 communicates with each base station 202A-202C and receives data from the base stations 202A-202C. Based on the data received from the base stations 202A-202C, the television receiver 104 determines its location. More particularly, the television receiver 104 triangulates the location based on the strength of signals received from the base stations 202A-202C. In at least one embodiment, the television receiver 104 utilizes other data, such as the angle of incidence for the signals received from the base stations 202A-202C to determine the location of the television receiver 104.

The television receiver 104 then transmits location information to one or more of the base stations 202A-202C. In at least one embodiment, the television receiver 104 establishes a phone call to the data collection system 110 prior to transmitting the location information to the base stations 202A-202C. In other embodiments, the location information may be encoded as part of a short message service (SMS) message or the like. Thus, the wireless telephone network 200 may include other components, such as a short message service center (SMSC) or other type of store-and-forward server for transmitting an SMS message or the like from the television receiver 104 to the data collection system 110. The location information is forwarded by the base stations 202A-202C to the MSC 204. The MSC 204 transmits the location information to the data collection system 110 through the PSTN 206. The data collection system 110 processes the location information and/or other data to identify piracy, account packing or other unauthorized uses of the television receiver 104.

In at least one embodiment, the data collection system 110 transmits data to the television receiver 104 through the wireless telephone network 200. For example, the data collection system 110 may identify that the television receiver 104 has been transferred to an unauthorized location based on the location information. The data collection system 110 may responsively generate a disablement command for the television receiver 104. For example, the command may be encapsulated in an SMS message addressed to the television receiver 104. The data collection system 110 transmits the SMS message to the PSTN 206, which forwards the SMS message to the MSC 204. The MSC 204 forwards the SMS message to one or more of the base stations 202A-202C, and the base stations 202A-202C transmit the SMS message to the television receiver 104. The television receiver 104 processes the SMS message to determine an appropriate action to take responsive to a command included in the SMS message. For example, the television receiver 104 may disable the output of audio/video content responsive to the command in the SMS message. Thus, through the operation of the wireless telephone network 200, the data collection system 110 may identify, eliminate and/or reduce the piracy, fraud and/or unauthorized usage of the television receiver 104.

Figure 3:
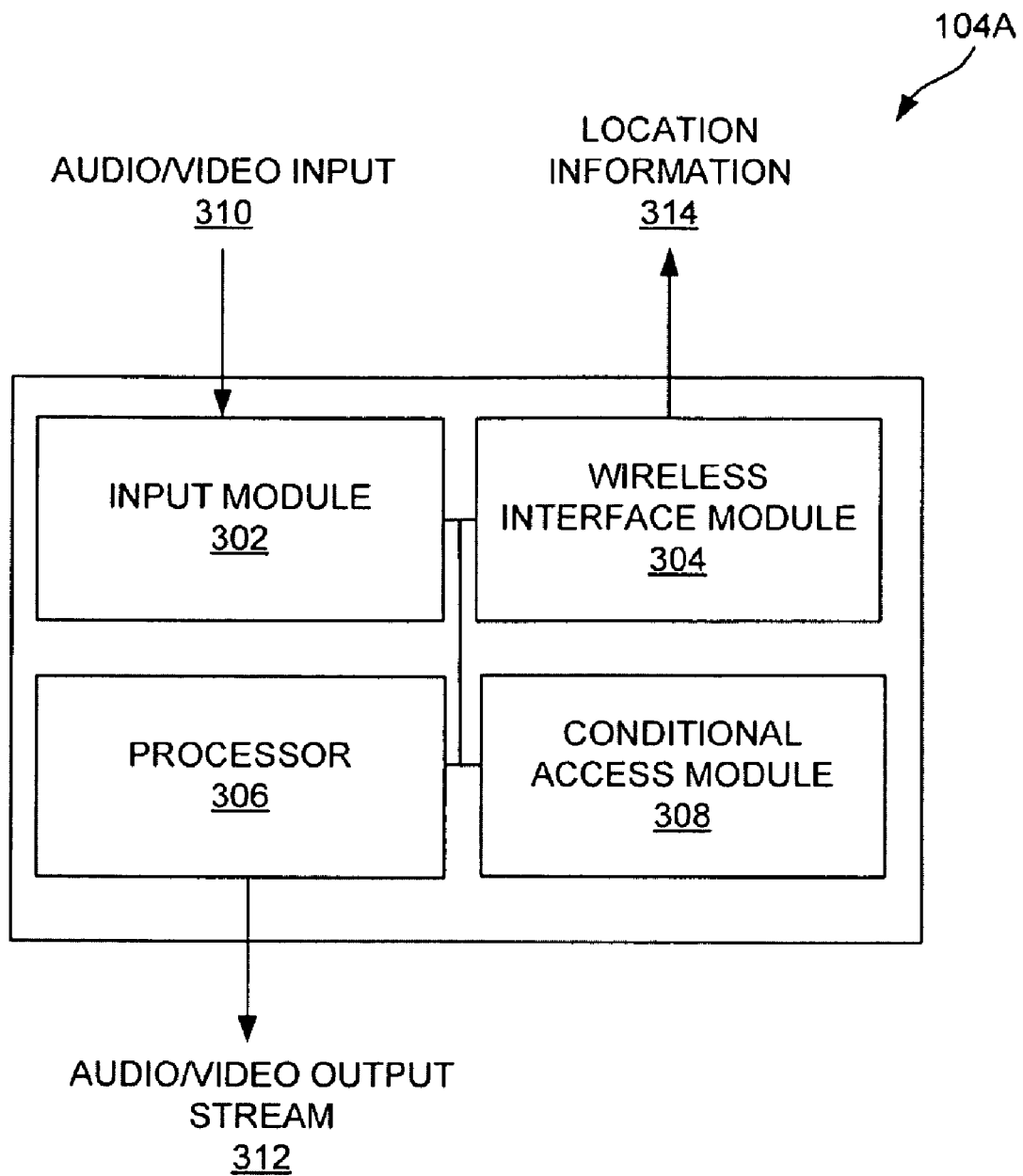
FIG. 3 illustrates an embodiment of a television receiver of FIG. 1.

FIG. 3 illustrates an embodiment of a television receiver of FIG. 1. FIG. 3 will be discussed in reference to the communication system 100 illustrated in FIG. 1. The television receiver 104A includes an input module 302, a wireless interface module 304, a processor 306 and a conditional access module 308. Each of these components will be discussed in greater detail below. The television receiver 104A may include other elements, such as a storage medium, a remote control interface and the like which are not illustrated for the sake of brevity of the discussion.

The input module 302 is operable to receive the audio/video input 310 from the content source 102 (see FIG. 1). In at least one embodiment, the input module 302 comprises a tuner operable to receive and tune any type of television signal. For example, the input module 302 may receive an over-the-air broadcast, a direct broadcast satellite signal, a cable television signal or an internet protocol television (IPTV) signal and tune the audio/video input 310 to extract selected television programming.

The conditional access module 308 is operable to decrypt the audio/video input 310. More particularly, the conditional access module 308 is operable to determine whether the television receiver 104A is authorized to output particular audio/ video content for presentation on the presentation device 108 (see FIG. 1). If the television receiver 104A is authorized to output the audio/video content, then the conditional access module 308 is operable to decrypt the audio/video input 310. In at least one embodiment, the conditional access module 308 is associated with access parameters that define particular programming that the television receiver 104A is authorized to output. The access parameters may be modified based on information received from the television distribution system 106 (see FIG. 1) and/or other systems, such as the data collection system 110.

The processor 306 is operable to control the operation of the television receiver 104A. The processor 306 may be a single processing device or a plurality of processing devices that cooperatively operate to control the operation of the television receiver 104A. The processor 306 may include various components or modules for processing and outputting audio/video content. Exemplary components or modules for processing audio/video content include a demodulator, a decoder, a decompressor and a transcoder module.

The processor 306 processes the audio/video input 310 to generate a audio/video output stream 312. The audio/video output stream 312 is outputted to the presentation device 108 (see FIG. 1) for presentation to a user. The processor 306 may incorporate circuitry to output the audio/video streams in any format recognizable by the presentation device 108, including composite video, component video, Digital Visual Interface (DVI) and High-Definition Multimedia Interface (HDMI). The processor 306 may also incorporate circuitry to support multiple types of these or other audio/video formats. In at least one embodiment, the television receiver 104 may be integrated with the presentation device 108, and the processor 306 may be operable to control the presentation of the audio/video output stream 312. The processor 306 may further aggregate data regarding the output of the content, such as ordering information, demographic information, health and diagnostic information regarding the television receiver 104A, signal reception quality information and the like.

The wireless interface module 304 is operable to communicate with the wireless communication network 112 (see FIG. 1). The wireless interface module 304 may comprise any type of transceiver operable to communicate with the wireless communication network 112. In some embodiments, a satellite antenna utilized by the television receiver 104A to receive television programming may be additionally utilized by the wireless interface module 304 to receive/transmit data to the wireless communication network 112. More particularly, the satellite antenna may include an integrated wireless antenna operable to communicate with the communication network 112. Thus, interference caused by walls and other obstacles is minimized by the placement of the antenna utilized by the wireless interface module 304.

As described above, the wireless interface module 304 is operable to communicate with a plurality of base stations of the wireless communication network 112 to identify the location of the television receiver 104A. After identifying the location of the television receiver 104A, the wireless interface module 304 is operable to transmit location information 314 to the data collection system 110 through the wireless communication network 112. As further described above, the wireless interface module 304 may transmit other data to the data collection system 110 in association with the location information 314. The data collection system 110 processes the location information and/or the other data to identify piracy, fraud and/or other types of unauthorized usage of the television receiver 104A.

If the data collection system 110 identifies unauthorized usage of the television receiver 104A, then the data collection system 110 may transmit disablement commands and/or access parameter modification commands to the television receiver 104A. In at least one embodiment, the input module 302 receives a disablement command and/or access parameter modification command in association with the video input. In other embodiments, the disablement commands and/or access parameter modification commands may be received through the wireless interface module 304. The processor 306 and/or the conditional access module 308 process the commands from the data collection system 110 as appropriate. For example, if the data collection system 110 transmits a disablement command to the television receiver 104A, then the processor 306 may operate to disable the output of the audio/video output stream 312. In at least one embodiment, the conditional access module 308 operates responsive to the disablement command to cease decrypting the audio/video input 310.

In other embodiments, the data collection system 110 transmits a command to the television receiver 104A to modify the access parameters utilized by the conditional access module 308. The processor 306 and/or the conditional access module 308 process the command to modify the conditional access parameters. For example, if the television receiver 104A is located in a different region than authorized by the television provider, then the access parameters may be modified to allow access to the programming authorized for the location rather than the programming permitted by the presently configured access parameters. In other embodiments, the access parameters may be modified to restrict the output of specific channels which are not part of the subscription associated with the television receiver 104A.

In at least one embodiment, the location information may be utilized to identify advertisements for output by the processor 306 in the audio/video output stream 312. For example, the input module 302 may receive a plurality of advertisements from the content source 102 (see FIG. 1). In at least one embodiment, the advertisements may be stored on a storage medium (not shown) of the television receiver 104 for subsequent playback. The audio/video input 310 may include information indicating when a particular type of advertisement is to be outputted by the processor 306. The processor 306 utilizes the location information to select an appropriate advertisement for presentation at the location of the television receiver 104A and outputs the advertisement in the audio/video output stream 312. In other embodiments, multiple advertisements may be provided on different channels, and the processor 306 may utilize the location information to mediate the output of the channels, selecting the appropriate advertisement for the location of the television receiver 104A.

It is to be appreciated that user disablement or tampering with the wireless interface module 304 may frustrate the flow of data through the communication system 300. An unscrupulous user may attempt to disable the wireless interface module 304, restricting the flow of information from the television receiver 104A to the data collection system 106. For example, a user may disable the wireless interface module 304 to prevent the transmission of usage information and/or location information to the data collection system 110 via the wireless communication network 112. To prevent tampering with the wireless interface module 304, the processor 306 may be operable to optionally detect that the wireless interface module 304 has been disabled and responsively disable the output of audio/video content. In some embodiments, the processor 306 may disable the conditional access module 308 responsive to detecting tampering or modifications to the wireless interface module 304.

Those of ordinary skill in the art will appreciate that the various functional elements 302 through 304 shown as operable within the television receiver 104A may be combined into fewer discrete elements or may be broken up into a larger number of discrete functional elements as a matter of design choice. Thus, the particular functional decomposition suggested by FIG. 3 is intended merely as exemplary of one possible functional decomposition of elements within the television receiver 104A.

Figure 4:
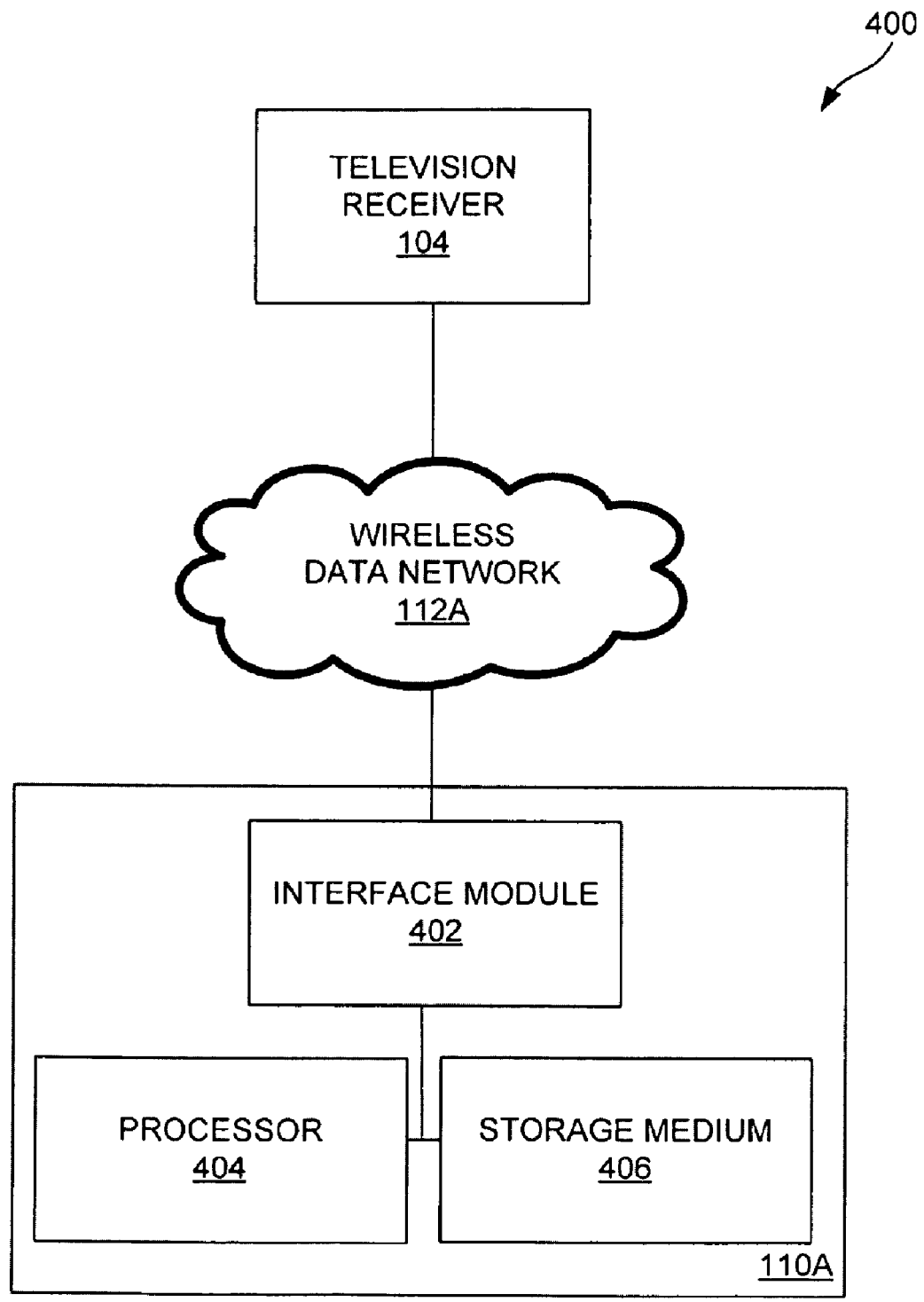
FIG. 4 illustrates an embodiment of another communication system.

In at least one embodiment, the data collection system 110 (see FIG. 1) comprises an internet connected server that receives data from a television receiver 104 over a local area network (LAN) or wide area network (WAN). FIG. 4 illustrates an embodiment of a communication system 400. More particularly, FIG. 4 illustrates the details of a server 108A that receives data from a television receiver 104 over a wireless data network 112A. The communication system 400 includes a television receiver 104, a wireless data network 112A and a server 108A. The server 108A includes an interface module 402, a processor 404 and a storage medium 406. Each of these components will be discussed in greater detail below. The discussion of components common to FIGS. 1-3 is omitted herein for the, sake of brevity, and the communication system 400 may comprise other elements, components or devices not illustrated for the sake of brevity.

The server 108A may be any type of device, system or combination of devices or systems that receives data from a remotely located television receiver 104 over the wireless data network 112A. The television receiver 104 establishes a connection to the server 108A to exchange data. An interface module 402 of the server 108A is communicatively coupled to the wireless data network 112A to receive the data from the television receiver 104 and/or transmit data to the television receiver 104 through the wireless data network 112A. In at least one embodiment, the interface module 402 may comprise an Ethernet adapter or the like communicatively coupled to the wireless data network 112A.

The storage medium 406 of the server 108A is configured to store any type of data utilized by the server 108A. The storage medium 406 may be any type of storage device, including hard drives, flash memory, tapes, optical storage devices and the like. Further, the storage medium 406 may include any number of storage devices that are physically and/or logically partitioned. In at least one embodiment, the storage medium 406 stores data regarding the television receiver 104. For example, the television receiver 104 may be a satellite television receiver and the data stored on the storage medium may include account information, pay-per-view ordering information, health and diagnostics information and the like. In at least one embodiment, the account information includes an authorized location of the television receiver 104.

The processor 404 is operable for controlling the operation of the server 108A. The processor 404 may be a single processing device or a plurality of processing devices that cooperatively operate to control the operation of the server 108A. In at least one embodiment, the processor 404 receives the data from the interface module 402 and associates the data with stored information regarding the television receiver 104. For example, if the data includes video ordering information regarding the television receiver 104, then the processor 404 may update account information regarding a user of the television receiver 104 based on the video ordering information. In other embodiments, the data may include demographic information or health and diagnostic information regarding the television receiver 104 that is stored and utilized by the processor 404.

The processor 404 and/or related systems may be operable to perform further processing of the data received from the television receiver 104. For example, the processor 404 may generate a bill for a user of the television receiver 104 based on the received video ordering information. If the received data includes health and diagnostic information, then the processor 404 may analyze the data to identify potential problems with the television receiver 104.

In at least one embodiment, the received data is utilized to identify locations of television receivers. For example, the processor 404 processes the location information received from the television receiver 104 to identify a location of the television receiver 104. In at least one embodiment, the processor 404 determines whether the location information matches an authorized location of the television receiver 104 stored on the storage medium 406. If the location information does not match the authorized location of the television receiver 104, then the processor 404 may generate disablement commands and/or access parameter modification commands for transmission to the television receiver 104 as described above. For example, the disablement command and/or access parameter modification command may be transmitted by a content source 102 multiplexed with audio/video content and/or other data transmitted to the television receiver 104. The disablement command and/or access parameter modification command may also be transmitted to the television receiver 104 through the wireless data network 112A. In some embodiments, the processor 404 may flag records of the television receiver 104 in the subscriber account database for further review by an operator.

In at least one embodiment, the processor 404 utilizes the location information to identify programming that the television receiver 104 is authorized to output for presentation. This may include adding and/or removing access by the television receiver 104 to particular channels based on various criteria. For example, access by the television receiver 104 to particular channels may be modified based on the transfer of the television receiver 104 to an alternate location. In some embodiments, access by the television receiver 104 to a channel may be modified based on a particular channel provider changing the access footprint to the channel.

For example, the processor 404 may identify the zip code location of the television receiver 104 based on the location information and identify programming authorized in that zip code (e.g., local channels). The processor 404 generates an entitlement command which is transmitted to the television receiver 104. The television receiver 104 utilizes the entitlement command to identify the audio/video content authorized for output. The entitlement command may be transmitted similarly to the disablement command as described above. If the television receiver 104 outputs channels not authorized in a particular location, then the processor 404 may generate commands which are transmitted to the television receiver 104 to restrict the output of the unauthorized channels.

Those of ordinary skill in the art will appreciate that the various functional elements 402 through 406 shown as operable within the server 108A may be combined into fewer discrete elements or may be broken up into a larger number of discrete functional elements as a matter of design choice. Thus, the particular functional decomposition suggested by FIG. 4 is intended merely as exemplary of one possible functional decomposition of elements within the server 108A.

Figure 5:
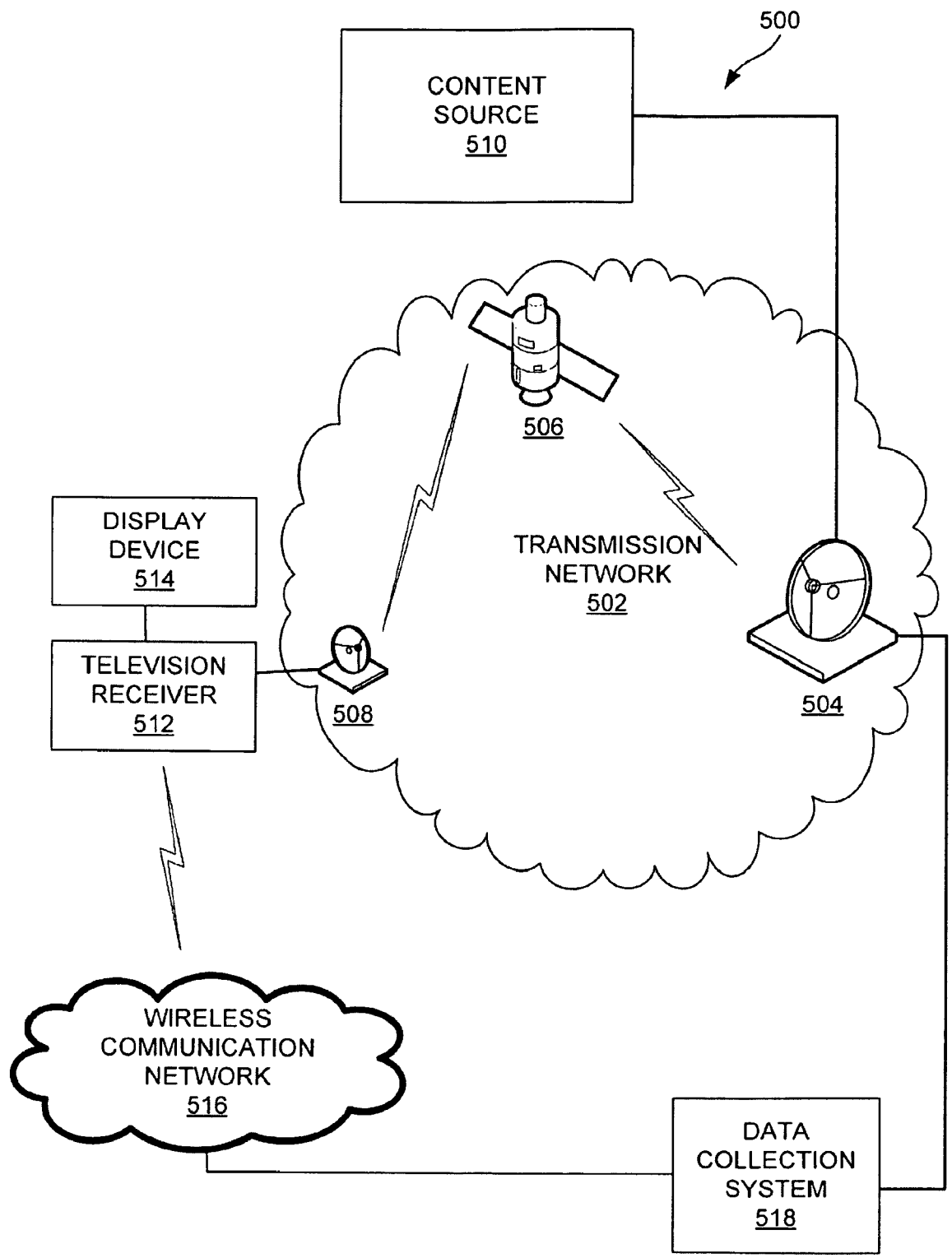
FIG. 5 illustrates an embodiment of a satellite broadcast system.

FIG. 5 illustrates an embodiment of a satellite broadcast system 500. The satellite broadcast system 500 includes a transmission network 502, an uplink system 504, a satellite 506, a satellite antenna 508, a content source 510, a television receiver 512, a display device 514, a wireless communication network 516 and a data collection system 518. Each of these components will be discussed in greater detail below. Discussion of components common to FIGS. 1-4 is omitted for the sake of brevity.

Satellite broadcast system 500 includes a content source 510 in signal communication with an uplink system 504 of a transmission network 502. The content source 510 provides the uplink system 504 with television programs that are transmitted to a television receiver 512. Television programs may be broadcast by the transmission network 502 to the television receiver 512. A television program may be embodied as MPEG-2, MPEG-4 or other digital video signals, analog or baseband signals, and/or other video data on a channel of the satellite broadcast system 500.

Satellite broadcast system 500 further comprises a satellite 506 in signal communication with the uplink system 504. The satellite 506 broadcasts television programs received from the uplink system 504. The satellite broadcast system 500 further comprises a satellite antenna 508 that receives the television program broadcast from the satellite 506. The satellite antenna 508 is in signal communication with the television receiver 512, and provides the television receiver 512 with an input signal comprised of one or more television programs. A broadcast television program is received by the television receiver 512 and outputted for presentation on the display device 514.

The television receiver 512 communicates with the wireless communication network 516 to identify the location of the television receiver 512. The television receiver 512 then transmits the location information and/or other data to the data collection system 518 through the wireless communication network 516. If the data collection system 518 identifies piracy, account packing and/or other unauthorized usage, then the data collection system 518 generates a disablement command and/or access parameter modification command for transmission to the television receiver 512.

In at least one embodiment, the data collection system 518 transmits the disablement command and/or access modification command to the uplink system 504. The uplink system 504 forwards the command to the satellite 506 for broadcast to the television receiver 512. The television receiver 512 receives the command from the data collection system 518 and processes the command as described above. The command may be identified and/or encoded for reception by the television receiver 512 such that other television receivers discard or ignore the command upon reception from the satellite 506. The disablement commands and/or access modification commands may also be transmitted from the data collection system 518 to the television receiver 512 through the wireless communication network 516, as described in detail above.

In some embodiments, the data collection system 518 may not identify any piracy, fraud and/or unauthorized uses of the television receiver 512, but may utilize the location information for other purposes. For example, as described above, the data collection system 518 may identify changes to the programming received by the television receiver 512, and may responsively generate commands to change the access by the television receiver 512 to particular programming. The programming modification commands may be delivered through the satellite 506 similarly to the disablement commands as described above.

Figure 6:
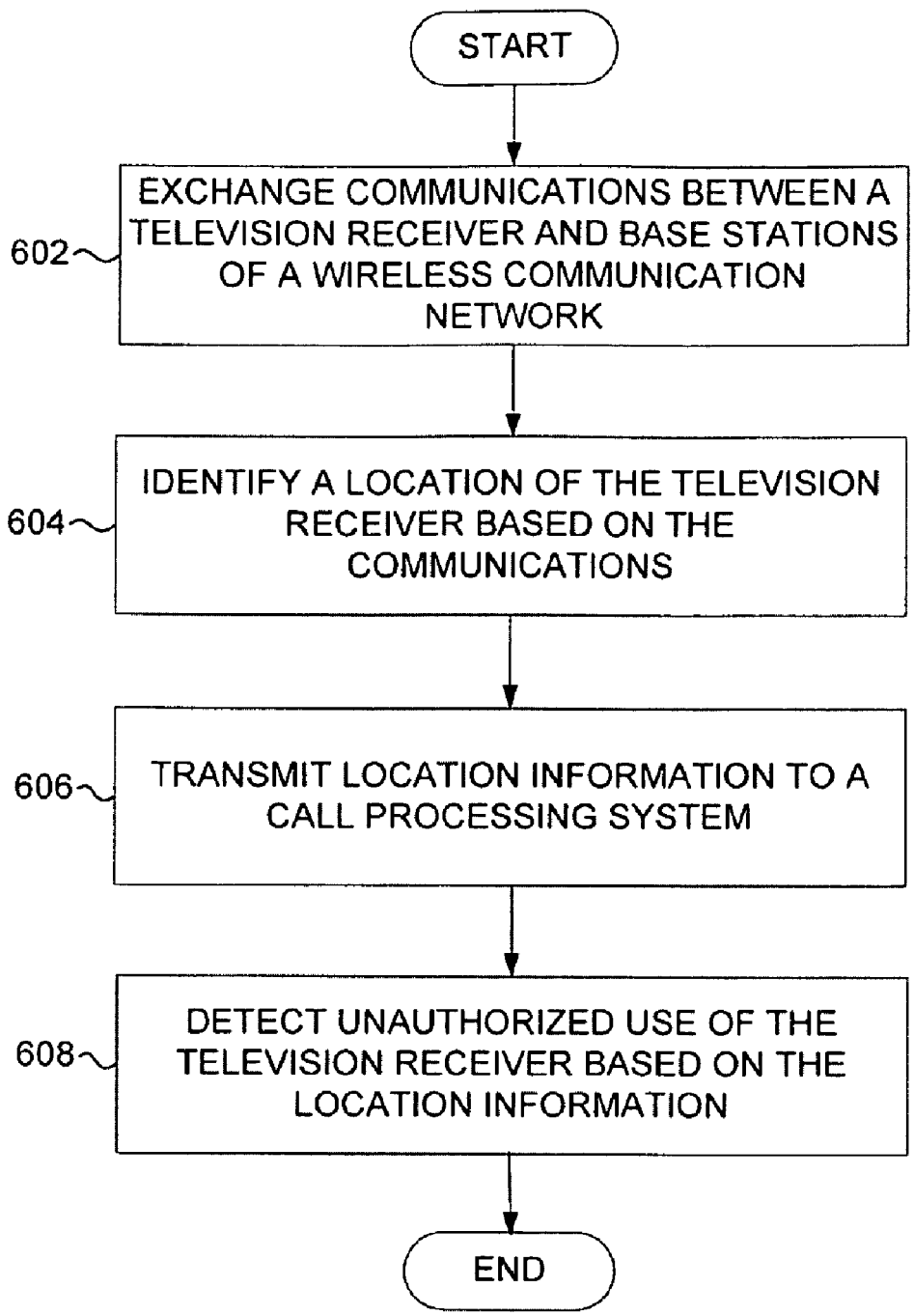
FIG. 6 illustrates an embodiment of a process for reducing unauthorized use in a television distribution system.

FIG. 6 illustrates an embodiment of a process for reducing unauthorized reception in a television distribution system. More particularly, the process of FIG. 6 allows a data collection system to receive location information from a television receiver and utilize the location information to identify piracy, fraud and other types of unauthorized usage of a television receiver. The process of FIG. 6 may include other operations not illustrated for the sake of brevity.

The process includes exchanging communications between a television receiver of a television broadcast system and a plurality of base stations of a wireless communication network (operation 602). In at least one embodiment, the communications may include transmitting data (e.g., usage information, health and diagnostics information and the like) from the television receiver to the data collection system through the wireless communication network. In some embodiments, the communications may be utilized to register the television receiver with the wireless communication network.

The process further includes identifying a location of the television receiver based on the communications (operation 604). In at least one embodiment, the communications may be utilized to triangulate the location of the television receiver. Triangulation may include measuring the strength of signals from multiple base stations to determine the location of the television receiver.

The process further includes transmitting location information regarding the location of the television receiver through the wireless communication network to a data collection system (operation 606). The location information may be transmitted through a phone call, data transmission, SMS message or the like. In some embodiments, the location information may be transmitted to the data collection system in association with other data from the television receiver.

The process further includes detecting unauthorized usage of a television receiver based on the location information (operation 608). For example, the data collection system may compare the location information to an authorized location of the television receiver stored in a subscriber account database to detect account packing, unauthorized transfers of the television receiver and the like. If no matching entry is located, then the television receiver may be identified as a pirated receiver. In some embodiments, the location information may be processed in association with usage information of the television receiver to identify whether the television receiver is outputting unauthorized programming for presentation to users.

A data collection system may flag particular television receivers which are suspected of piracy, fraud and other types of unauthorized use for further review by an operator. As described above, the data collection system may optionally transmit disablement commands and the like to eliminate and/or reduce the identified unauthorized usage of the television receiver. Thus, through the process illustrated in FIG. 6, a television provider may identify many different types of unauthorized use of television receivers and may take further action to eliminate and/or reduce the unauthorized use.

Although specific embodiments were described herein, the scope of the invention is not limited to those specific embodiments. The scope of the invention is defined by the following claims and any equivalents therein.

I claim:

1. A method for reducing unauthorized usage in a television distribution system, the method comprising:
   receiving an audio/video stream at a first television receiver of a television distribution system, the audio/video stream communicated via a content transmission network;

exchanging communications between the first television receiver and a plurality of base stations of a wireless communication network that is different than the content transmission network, the first television receiver associated with a subscriber account, wherein exchanging communications involves the first television receiver receiving signals from each of the plurality of base stations;

the first television receiver measuring signal strengths and/or angles of reception for the signals received from the plurality of base stations to triangulate and identify a location of the first television receiver;

the first television receiver transmitting location information regarding the location of the television receiver through the wireless communication network to a data collection system, and the first television receiver transmitting aggregated data with the location information through the wireless communication network, the aggregated data regarding audio/video content output by the first television receiver and regarding general operating conditions of the first television receiver, the data collection system determining that the first television receiver and one or more second television receivers associated with the same subscriber account are disparately located based on the location information; and receiving a command, at one or more of the television receivers, the command modifying the access parameters used for the reception of programming by the television receiver.

2. The method of claim 1, further comprising:
receiving a disablement command at the first television receiver, the disablement command instructing the first television receiver to disable the output of audio/video content.

3. A television receiver comprising:
an input module that receives audio/video content from a content source via a content transmission network and according to access parameters associated with a subscriber account;
a processor communicatively coupled to the input module, the processor outputting the audio/video content for presentation on a presentation device and aggregating data regarding the output of the audio/video content; and
a wireless interface module communicatively coupled to the processor, the wireless interface module communicating with a plurality of base stations of a wireless communication network that is different than the content transmission network, to receive signals from each of the plurality of base stations; wherein
the processor measures signal strengths of the signals received from the plurality of base stations and triangulates a location of the television receiver based on the measured signal strengths, resulting in a triangulated location;
the wireless interface module transmits location information that indicates the triangulated location of the television receiver and the aggregated audio/video output data to a data collection system through the wireless communication network; and
the television receiver is one of multiple television receivers that are associated with the subscriber account, the data collection system determining, based on the triangulated location of the television receiver, whether the television receiver is disparately located in relation to one or more television receivers that are associated with the subscriber account, the processor receiving a command modifying access parameters.

4. The television receiver of claim 3, wherein the location information indicating disparate locations of two or more television receivers indicates that one or more of the television receivers is not authorized to receive the audio/video content, and wherein the input module receives the command from the content source requesting disablement of output of the audio/video content by the television receiver.

5. The television receiver of claim 3, wherein the information indicating disparate locations of two or more television receivers indicates that one or more television receivers are not authorized for use at the location, and wherein the wireless interface module receives a command through the wireless communication network requesting disablement of output of the audio/video content by the television receiver.

6. The television receiver of claim 3, wherein the input module receives a command identifying the audio/video content that the processor is authorized to output for presentation, the command generated based on the location information.

7. The television receiver of claim 3, wherein the processor detects that the wireless interface module has been disabled and responsively disables the output of the audio/video content.

8. The television receiver of claim 3, wherein the wireless interface module is communicatively coupled to a wireless antenna integrated with a satellite antenna, and wherein the wireless interface module receives the data through the wireless antenna.

9. A communication system comprising:
a data collection system; and
a plurality of television receivers, each receiver including:
an input module that receives audio/video content from a content source via a content transmission network;
a conditional access module communicatively coupled to the input module that determines whether the television receiver is authorized to output the audio/video content, and that further decrypts the audio/video content responsive to determining that the television receiver is authorized to output the audio/video content;
a processor communicatively coupled to the conditional access module that receives the decrypted audio/video content and that outputs the decrypted audio/video content for presentation on a presentation device and that aggregates data regarding the output of the decrypted audio/video content; and
a wireless interface module communicatively coupled to the processor that communicates with a plurality of base stations of a wireless communication network that is different than the content transmission network, to receive signals from each of the plurality of base stations, wherein the processor measures signal strengths of the signals received from the plurality of base stations and triangulates a location of a respective one of the plurality of television receivers based on the measured signal strengths, resulting in a triangulated location, and wherein the wireless interface module further transmits location information that indicates the triangulated location and transmits the data to a data collection system through the wireless communication network;
the data collection system processing the location information to determine whether the television receivers are disparately located, and that further generates a disablement command for transmission to at least one of the plurality of television receivers requesting disablement of the conditional access module responsive to determining that the television receivers are disparately located.

10. The communication system of claim 9, wherein the television receivers receive the disablement command through the input module.

11. The communication system of claim 9, wherein the television receivers receive the disablement command through the wireless interface module.

12. The communication system of claim 9, wherein the television receiver receives the entitlement command through the input module.

13. The communication system of claim 9, wherein the processor detects that the wireless interface module has been disabled and responsively disables the output of the audio/video content.

14. The communication network of claim 9, wherein the wireless communication network comprises a wireless telephone network.

15. The method of claim 1, wherein receiving the command further comprises:
modifying the access parameters of the television receiver to allow access to the programming authorized for the location rather than the programming permitted by the presently configured access parameters.

16. The method of claim 1, wherein transmitting the location information further comprises:
transmitting the location information to the data collection system in association with usage information.

17. The method of claim 1, wherein transmitting the location information further comprises:
transmitting the location information to the data collection system in association with health and diagnostics information.

18. The method of claim 1, wherein transmitting the location information further comprises:
transmitting the location information to the data collection system in association with data regarding what time of day that the television receiver is unplugged from a power supply.

19. The method of claim 1, wherein transmitting the location information regarding the location of the first television receiver further comprises:
transmitting the location information according to a predefined schedule.

20. The method of claim 1, wherein transmitting the location information regarding the location of the first television receiver further comprises:
transmitting the location information responsive to a change in the location.

* * * * *